(12) United States Patent
Park et al.

(10) Patent No.: US 8,165,522 B2
(45) Date of Patent: Apr. 24, 2012

(54) METHOD AND APPARATUS FOR PROVIDING TOUCH AND PLAY (TAP)—BASED SERVICE AND SYSTEM USING THE METHOD AND APPARATUS

(75) Inventors: Duck-Gun Park, Daejeon (KR);
Sung-Weon Kang, Daejeon (KR);
Chang-Hee Hyoung, Daejeon (KR);
Jin-Bong Sung, Daejeon (KR);
Jung-Hwan Hwang, Daejeon (KR);
Jin-Kyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 990 days.

(21) Appl. No.: 12/096,366

(22) PCT Filed: Dec. 5, 2006

(86) PCT No.: PCT/KR2006/005188
§ 371 (c)(1),
(2), (4) Date: Jun. 5, 2008

(87) PCT Pub. No.: WO2007/066942
PCT Pub. Date: Jun. 14, 2007

(65) Prior Publication Data
US 2008/0294722 A1 Nov. 27, 2008

(30) Foreign Application Priority Data

Dec. 8, 2005 (KR) .................. 10-2005-0120165
Sep. 7, 2006 (KR) .................. 10-2005-0086282

(51) Int. Cl.
*H04B 5/00* (2006.01)
(52) U.S. Cl. ............... 455/41.1; 455/3.01; 455/3.05; 455/3.06; 455/410; 455/411; 455/418; 455/420; 455/68; 455/100; 340/5.8; 340/5.81; 340/5.82; 713/186
(58) Field of Classification Search ........... 455/3.01, 455/3.05, 3.06, 409–411, 418–420, 41.1, 455/68–69, 100; 340/5.8, 5.81–5.83; 713/186
See application file for complete search history.

(56) References Cited

U.S. PATENT DOCUMENTS
5,682,032 A * 10/1997 Philipp .................. 235/422
(Continued)

FOREIGN PATENT DOCUMENTS
EP 1096722 A2 5/2001
(Continued)

OTHER PUBLICATIONS

Shinagawa et al., "A Near-Field-Sensing Transceiver for Intrabody Communication Based on the Electrooptic Effect", IEEE vol. 53, No. 6, pp. 1533-1538 (Dec. 2004).

(Continued)

*Primary Examiner* — Tuan A Tran

(57) ABSTRACT

Provided are a method, apparatus and system for providing a touch and play (TAP)-based service. The method includes setting respective device identifiers of a plurality of devices which can be connected to a device using an organism as a transmission channel and setting services to be provided to a user through the interaction between the device and each of the devices corresponding to the device identifiers, respectively; having at least two execution levels so that one of the at least two execution levels can be selected in order to determine whether to execute a service in cooperation with one of the devices and setting one of the at least two execution levels according to an input from a user; receiving a device identifier of another device if the device is connected to one of the devices using the organism as the transmission channel; recognizing services set for the other device and identifying a service that is to be provided to the user through the interaction between the device and the other device; determining whether to execute the identified service according to the set execution level; and automatically recognizing information required to provide the service that is determined to be executed in cooperation with the other device and executing the determined service. When the method, apparatus and the system are used, a user can receive a desired service by simply touching two devices.

37 Claims, 9 Drawing Sheets

U.S. PATENT DOCUMENTS

| | | | |
|---|---|---|---|
| 5,796,827 A * | 8/1998 | Coppersmith et al. | 713/182 |
| 5,811,897 A | 9/1998 | Spaude et al. | |
| 6,223,018 B1 | 4/2001 | Fukumoto et al. | |
| 6,771,161 B1 * | 8/2004 | Doi et al. | 340/5.64 |
| 7,352,996 B2 * | 4/2008 | Kumar | 455/41.1 |
| 7,542,720 B2 * | 6/2009 | Yoda et al. | 455/41.1 |
| 2002/0128030 A1 | 9/2002 | Elden et al. | |
| 2004/0152440 A1 | 8/2004 | Yoda et al. | |

FOREIGN PATENT DOCUMENTS

| | | |
|---|---|---|
| JP | 2002-163029 A | 6/2002 |
| JP | 2002-236651 A | 8/2002 |
| JP | 2002-261702 A | 9/2002 |
| JP | 2004-030605 A | 1/2004 |
| JP | 2004-260800 A | 9/2004 |
| KR | 1020000011200 A | 2/2000 |
| KR | 1020030039759 A | 5/2003 |
| KR | 1020060130513 A | 12/2006 |

OTHER PUBLICATIONS

Korean Intellectual Property Office, International Search Report for International Application No. PCT/KR2006/005188, 3 pages (Published: Mar. 28, 2007).

* cited by examiner

FIG. 6

| | PC | TV | Printer | Camera | Mobile phone | MP3 Audio |
|---|---|---|---|---|---|---|
| PC | (F) Network Connection | (←) Monitor Connection | (←) Printer Connection | (←) Camera Connection | (←) Sync Connection | (←) Network Connection |
| TV | (↑) Monitor Connection | | (←) Printer TV schedule | (←) Slide Show | (←) User TV schedule | (←) Play MP3 music |
| Printer | (↑) Printer Connection | (←) Printer TV schedule | | (←) Print Photo | (←) Print phonebook | (←) Print Album title |
| Camera | (↑) Camera Connection | (↑) Slide Show | (↑) Print Photo | | (↑) Set as wall paper | |
| Mobile phone | (↑) Sync Connection | (↑) User Identification | (↑) Print phonebook | Set as wall paper | (F) Exchange Name card | (←) Set as Ring Sound |
| MP3 Audio | (↑) Network Connection | (↑) Play MP3 on TV | (↑) Print Album title | | (↑) Set as Ring Sound | (F) Playlist Sync |

FIG. 7

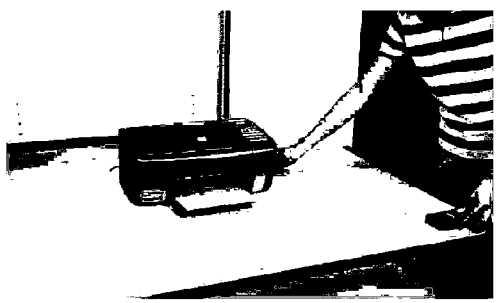

METHOD AND APPARATUS FOR PROVIDING TOUCH AND PLAY (TAP)—BASED SERVICE AND SYSTEM USING THE METHOD AND APPARATUS

CROSS REFERENCE TO RELATED APPLICATIONS

This application is a US National Stage of International Patent Application No. PCT/KR2006/005188, filed Dec. 5, 2006, which in turn claims the benefit of Korean Patent Application No. 10-2005-0120165, filed Dec. 8, 2005 and Korean Patent Application 10-2006-0086282, filed Sep. 7, 2006, the disclosures of all three applications are incorporated herein by reference.

TECHNICAL FIELD

The present invention relates to a method of receiving a service using two devices, and more particularly, to an apparatus and method for providing a touch and play (TAP)-based service, the apparatus and method enabling a user to receive a desired service by touching two apparatuses.

BACKGROUND ART

Consumers now desire to connect a mobile terminal to another mobile terminal or various peripherals. Accordingly, there are a variety of connection methods used by diverse mobile terminal manufacturers, such as a docking system unique to each product, connection terminals, and various memory devices.

A recently adopted Universal Serial Bus On-The-Go (USB OTG) standard reflects the growing needs for data exchange between two devices. However, considering that devices to be connected are mobile devices, the USB OTG standard has the following disadvantages. First, users have to carry USB cables, which are not easy to carry around. In addition, the users themselves have to connect or disconnect two devices. Therefore, if such connections or disconnections occur frequently, a lot of time and efforts are wasted on the part of users, which are not at all desirable. Theses disadvantages stem from the fact that the USB OTG standard is based on wired communication technology.

On the other hand, wireless communication technology eliminates the need to carry cables. However, the wireless communication technology has technological problems associated with wireless technology, such as power consumption, costs, and frequency regulations. Furthermore, the wireless communication technology has the following disadvantages in interface engineering aspects.

Given the current trend that many devices are installed in a narrower space, there is a high probability that many devices will exist in a wireless network in the future. In addition, a network connection between devices is different from that of a conventional network.

Such network connections and disconnections frequently occur depending on users' actual activities. In addition, the duration of network connection is generally short. For example, in the case of Bluetooth, if a user desires to print a picture from a personal digital assistant (PDA), the user has to search for a network and then an available device in the found network. Next, the user has to select a printer and connect the selected printer to the PDA. Then, the user selects the picture to print and selects a print menu. Finally, the user disconnects the network connection. Some of these operations may be preset with a few button clicks on a menu. Hence, the number of operations performed by the user may be reduced. However, this kind of network connection and disconnection still require the concentration, time and intervention of the user. Furthermore, the user needs to be familiar with how to use the PDA.

Intuition is an important requirement for future application devices. As devices become sophisticated, people tend to have trouble learning how to use those devices.

In an example of interaction between a camera and a printer, a conventional method using Bluetooth or an USB requires a user to perform network connection before starting a printing operation and perform network disconnection after the printing operation. However, such network management activities are not directly relevant to the printing operation, which is a major interest of the user. The network connection and disconnection are mere processes required for the printing operation. However, the user has to understand and learn these processes in order to perform the printing operation.

DISCLOSURE OF INVENTION

Technical Problem

The present invention provides a method, apparatus and system which can automatically identify a service to be provided to a user through the interaction between a plurality of devices touched by the user and provide the identified service to the user.

Technical Solution

According to an aspect of the present invention, there is provided a method of providing a touch and play (TAP)-based service. The method includes setting respective device identifiers of a plurality of devices which can be connected to a device using an organism as a transmission channel and setting services to be provided to a user through the interaction between the device and each of the devices corresponding to the device identifiers, respectively; having at least two execution levels so that one of the at least two execution levels can be selected in order to determine whether to execute a service in cooperation with one of the devices and setting one of the at least two execution levels according to an input from a user; receiving a device identifier of another device if the device is connected to one of the devices using the organism as the transmission channel; recognizing services set for the other device and identifying a service that is to be provided to the user through the interaction between the device and the other device; determining whether to execute the identified service according to the set execution level; and automatically recognizing information required to provide the service that is determined to be executed in cooperation with the other device and executing the determined service.

According to another aspect of the present invention, there is provided a method of providing a TAP-based service. The method includes setting respective device identifiers of a plurality of devices which can be connected to a device using an organism as a transmission channel and setting services to be provided to a user through the interaction between the device and each of the devices corresponding to the device identifiers, respectively; receiving a device identifier of another device if the device is connected to one of the devices using the organism as the transmission channel; recognizing services set for the other device and identifying a service to be provided to the user through the interaction between the device and the other device; determining which of the device and the other device connected to the device is a master or a slave; exchanging signals using a master/slave method in which the master initiates data transmission and the slave responds to the master if a master/slave relationship between the two devices is determined; and automatically recognizing information required to provide the service that is determined to be executed in cooperation with the other device and executing the determined service.

According to another aspect of the present invention, there is provided an apparatus for providing a TAP-based service. The apparatus includes a service setting unit setting respective device identifiers of a plurality of devices which can be connected to the apparatus using an organism as a transmission channel and setting services that are to be provided to a user through the interaction between the apparatus and each of the devices corresponding to the device identifiers, respectively; an execution level setting unit having at least two execution levels so that one of the at least two execution levels can be selected in order to determine whether to execute a service in cooperation with one of the devices and setting one of the at least two execution levels according to an input from a user; a service determination unit receiving a device identifier of one of the devices if the apparatus is connected to the device using the organism as the transmission channel, recognizing services set for the device, identifying a service to be provided to the user through the interaction between the apparatus and the device, and determining whether to execute the identified service according to the execution level set by the user; and a service execution unit automatically recognizing information required to provide the service that is determined to be executed in cooperation with the device and executing the determined service.

According to another aspect of the present invention, there is provided an apparatus for providing a TAP-based service. The apparatus includes a service setting unit setting respective device identifiers of a plurality of devices which can be connected to the apparatus using an organism as a transmission channel and setting services to be provided to a user through the interaction between the apparatus and each of the devices corresponding to the device identifiers, respectively; a service determination unit receiving a device identifier of one of the devices if the apparatus is connected to the device using the organism as the transmission channel, recognizing services set for the device, and identifying a service that is to be provided to the user through the interaction between the apparatus and the device; and a service execution unit determining which of the apparatus and the device connected to the apparatus is a master or a slave, automatically recognizing information required to provide a service that is determined to be executed in cooperation with the device after the apparatus and the device exchange signals using a master/slave method in which the master initiates data transmission and the slave responds to the master, and executing the determined service.

According to another aspect of the present invention, there is provided a system for providing a TAP-based service using the interaction between a plurality of devices, each of the devices including a touch unit transmitting/receiving information to/from another device using at least one organism as a transmission channel when the organism touches the device and the other device; a context collection unit collecting context information including the transmitted/received information from the touch by the organism; a service determination unit determining a service that is to be provided to a user through the interaction between the device and the other device based on the collected context information; and a service execution unit executing an operation corresponding to the determined service.

Advantageous Effects

According to the present invention, a user may receive a desired service by simply touching devices related to the desired service. The present invention still requires network connection and disconnection. However, user intervention is not required in the process of network connection and disconnection. In addition, all context information required for network connection and data transmission can be obtained from the touching behavior of the user, thus eliminating the need for user intervention.

According to the present invention, if identifiers and data are all transmitted through human body communication, data communication is limited to the human body. Therefore, the problems of privacy and wiretapping can be easily solved.

According to an embodiment of the present invention, when a device A can be selectively connected to a plurality of devices (B, C, D, . . . ), a service that can be provided by the device A when connected to, for example, the device B, is defined, and an execution level for executing the service is preset, thereby preventing an interaction unintended by a user. In addition, if a device X is added to the devices (B, C, D . . . ), which are expected to be connected to the device A, services that can be executed between the device A and the device X are mapped to execution levels and are set accordingly. In this way, more various services that can be executed through the interaction between a plurality of devices can be set. Therefore, a service appropriate for each situation can be executed, and service can be expanded by adding new devices.

According to the present invention, a function being performed or desired to be performed by a device can be performed by another device in such a way that the function is expected to operate when the two devices are connected to each other. In other words, while listening to music on an MP3 player, if a user comes home and touches an audio player at home, the music that the user was listening to on the MP3 player can be played back by the audio player at home. In addition, while watching a channel on a DMB TV, if a user comes home and touches a TV at home, the channel that the user was watching on the DMB TV can be provided on the TV at home. After photographing a moving image using a camcorder, if a user comes home and touches a TV at home while reproducing the photographed moving image using the camcorder, a wireless 1394 network is formed through human body communication. Therefore, the moving image is transmitted to the TV from the camcorder over the wireless 1394 network and is reproduced by the TV.

DESCRIPTION OF DRAWINGS

FIG. 6 illustrates a context-aware matrix according to an embodiment of the present invention;

FIG. 7 illustrates the result of applying the present invention to a digital camera, a high-definition TV (HDTV), and a printer;

MODE FOR INVENTION

Figure 1:
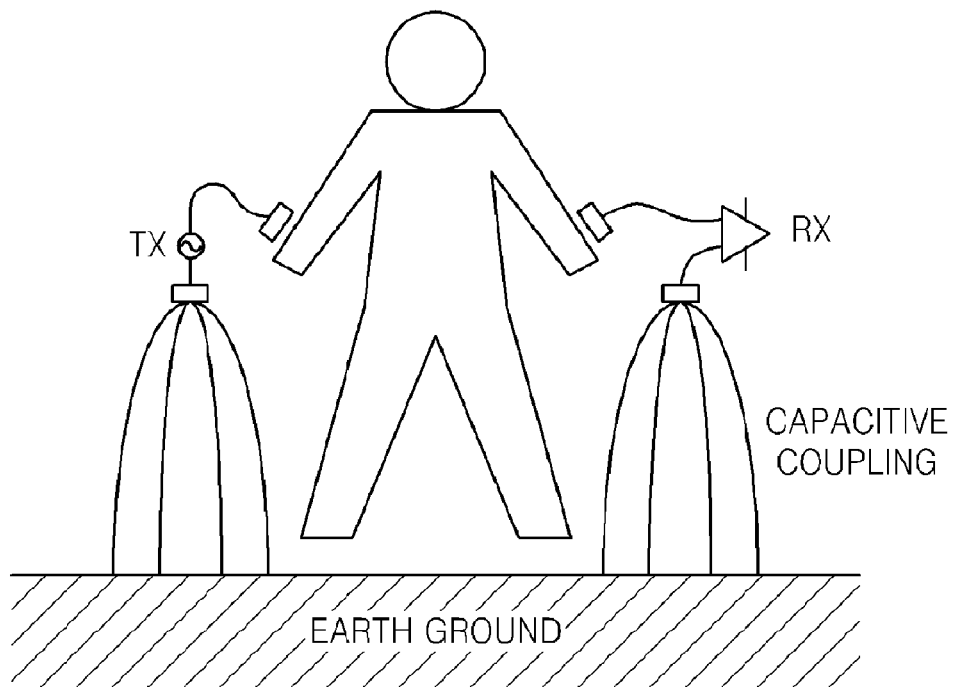
FIG. 1 is a diagram for explaining the concept of a near filed intra-body communication.

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

In the case of Bluetooth, if a user desires to print a picture from a personal digital assistant (PDA), the user has to search for a network and then an available device in the found network. Next, the user has to select a printer and connect the selected printer to the PDA. Then, the user selects the picture to print and selects a print menu. Finally, the user disconnects the network connection. Some of these operations may be preset with a few button clicks on a menu. Hence, the number of operations performed by the user may be reduced. However, this kind of network connection and disconnection still require the concentration, time and intervention of the user. Furthermore, the user needs to be familiar with how to use the PDA. User intervention in these operations is required to transmit desired context information. In the above example of printing the picture from the PDA, the following context information required for the printing service was available—1) user authentication, i.e., the authority to use the printer, 2) selection of devices, i.e., the PDA and the printer, 3) selection of a service, i.e., the printing service, and 4) data, i.e., a file to be printed.

Anind K. Dey defines context as any information used to characterize a situation where an entity is. The entity denotes a person, a place, or an object that is considered relevant to the interaction between a user and an application, including the user and applications themselves.

If a system uses context to provide a user with relevant information or service, the system is context-aware. In this case, 'relevant' denotes being dependent on the user's operation.

One of ultimate goals of a context-aware computing model is to obtain an application which can perform an appropriate operation at an appropriate time for a user without requiring the user's direct intervention. To make this automatic context-aware application become a reality, a method of extracting context without the user's manual inputs is required.

Conventional technologies for extracting more context from the operation of a user touching an object have been disclosed. Touching an object or when a person touches the object may provide useful information regarding a desktop environment. Touching may also be used to pick up data in one place and drop it in another place. Synchronized touching between two devices has been used to wirelessly connect the two devices. These conventional technologies use information regarding touch itself, which is obtained using touch sensors.

However, Zimmerman has suggested that a human body may be used as a transmission medium. After Zimmerman made this suggestion, various studies have been conducted to improve characteristics, e.g., a data rate, of this communication method and understand the characteristics in diverse environments.

When this communication method is used, a simple touch may have more information. Rekimoto and others have studied a wearable authentication key for personalizing an environmental entity.

FIG. 1 is a diagram for explaining the concept of a near filed intra-body communication suggested by Zimmerman. The near filed intra-body communication suggested by Zimmerman used an on-off-keying (OOK) modulation scheme operating at 330 KHz and having a data transmission rate of 2400 bps. After many hardware devices using near filed intra-body signal transmission were developed, Kurt Patridge used a frequency shift keying modulation scheme operating at 180 KHz and having a carrier frequency of 140 KHz and a data transmission rate of 38.4 kbps. ElectrauraNet of NTT Docomo has achieved a data transmission rate of as much as 10 Mbps without having a carrier frequency and using an electro-optic sensor and non-return-to-zero (NRZ) signal transmission. However, this system is as large as 15 by 15 by 80☐ and consumes as much as 650☐ since it uses the electro-optic sensor. NTT Docomo used the electro-optic sensor since ElectrauraNet has extremely high input impedance exceeding 100 mega ohm and has an ultra-wide bandwidth.

Figure 2:
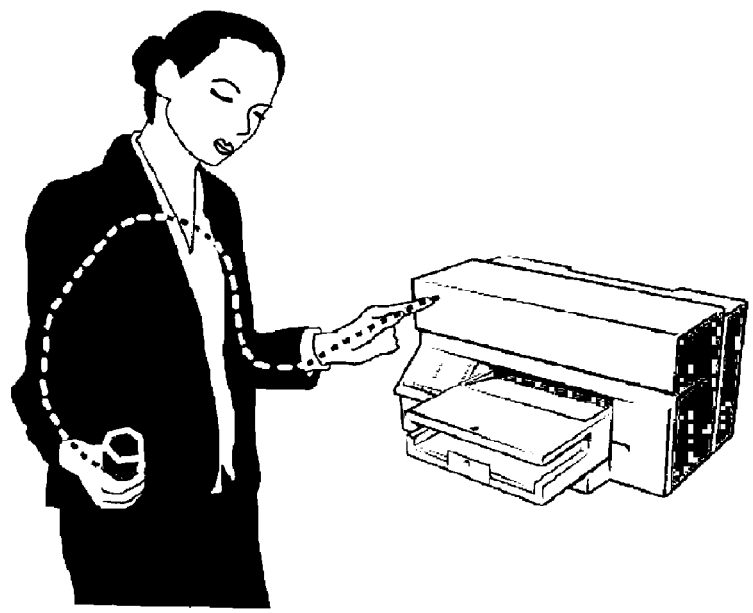
FIG. 2 is a diagram for explaining the concept of a touch and play (TAP)-based service according to an embodiment of the present invention.

FIG. 2 is a diagram for explaining the concept of a touch and play (TAP)-based service according to an embodiment of the present invention. Referring to FIG. 2, when a user touches a camera and a printer by the hand, a desired picture file in the camera is transmitted to the printer through the body of the user, and the printer prints the received picture file.

Figure 3:
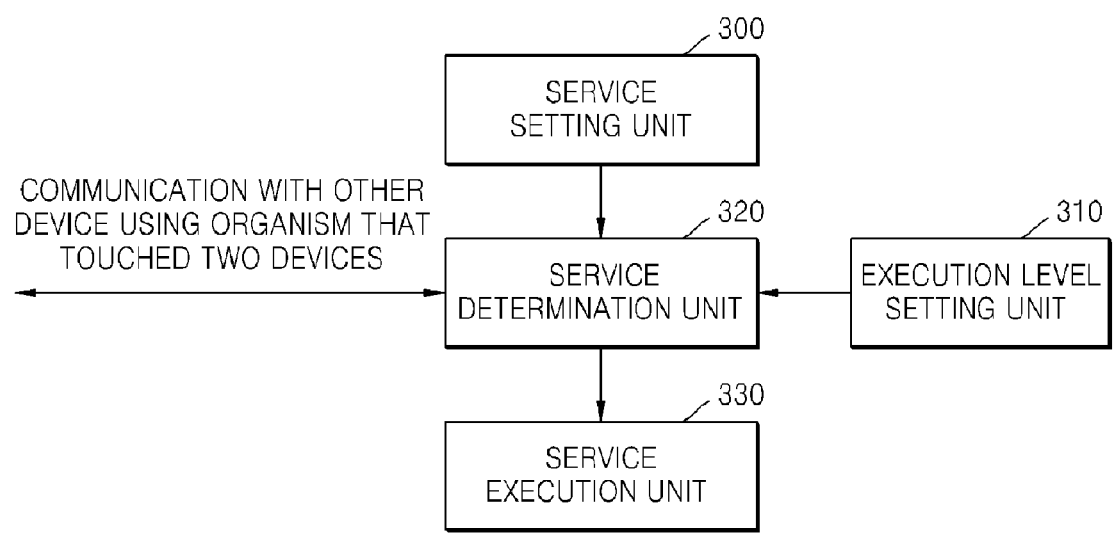
FIG. 3 is a block diagram of an apparatus for providing a TAP-based service according to an embodiment of the present invention.

FIG. 3 is a block diagram of an apparatus for providing a TAP-based service according to an embodiment of the present invention. The apparatus includes a service setting unit 300, an execution level setting unit 310, a service determination unit 320, and a service execution unit 330.

The service setting unit 300 sets device identifiers of a plurality of devices which can be connected to the apparatus using an organism as a transmission channel and sets services to be provided to a user through the interaction between the apparatus and each of the devices corresponding to the device identifiers, respectively.

The execution level setting unit 310 has at least two execution levels such that one of the at least two execution levels can be selected in order to determine whether to execute services using the devices. In response to an input from the user, the execution level setting unit 310 sets an execution level. For example, the execution levels may be classified into an execution level 'High,' which indicates that all services set for the devices, respectively, can be executed, an execution level 'Normal,' which indicates that only a designated service can be executed, an execution level 'Low,' which indicates that a user can select a service using a separate interface and execute the selected service, and an execution level 'None,' which indicates that no service can be executed. In another example of execution levels, each service may be matched with an execution level according to the degree of obvious interaction involved between the apparatus and each of the devices to be connected to the apparatus using the organism as a transmission channel and may be executed accordingly.

When the apparatus is connected to a device using the organism as a transmission channel, the service determination unit 320 receives the device identifier of the device from the device, recognizes services set for the received device identifier, identifies a service to be provided through the interaction between the apparatus and the device, and determines whether to execute the identified service in cooperation with the device according to an execution level selected by the user. According to an example of a determination method used by the service determination unit 320, each service to be provided by each device, which will be connected to the apparatus using the organism as a transmission channel, is matched with any one of the execution levels. Hence, the service determination unit 320 determines whether to execute a service according to an execution level set by the user.

In this specification, the terms 'device identifier' and 'function identifier' will be used to indicate an identifier of a device. The device identifier indicates an attribute of a device. For example, if a device is a camera, an identifier indicating the camera is a device identifier. If a device is a multi-function device, e.g., a PDA, having various functions such as MP3 playback, moving-image playback and web browsing, the service determination unit 320 may receive the device identifier of the multi-function device and obtain context indicating functions that can be performed by the device based on the received device identifier. However, it is generally difficult to identify currently activated functions of the multi-function device based on the device identifier.

As described above, if a device is a multi-function device, it may be advantageous to obtain function identifiers of activated functions of the multi-function device in order to accurately utilize context and provide an intuitive service. Therefore, a device identifier and a function identifier will be differentiated throughout the specification. However, it may be understood by those of ordinary skill in the art that, in the case of a device having a single function, a device identifier is a function identifier. A detailed description of this matter will be described in detail later with reference to FIG. 4.

The service execution unit 330 automatically recognizes information required to provide the service determined to be executed in cooperation with the device and then executes the service. In other words, the service execution unit 330 determines which of the device and the apparatus is a master and which of them is a slave. Then, the device and the apparatus exchange signals using a master/slave method in which a master starts to transmit data to a slave and the slave responds to the master. In so doing, the service execution unit 330 automatically recognizes information required to provide the service determined to be executed in cooperation with the device and then executes the service.

When the present embodiment is implemented using the master/slave method in order for communication between two devices and service provision, the service setting unit 300 includes information required to determine which of the apparatus and a device connected to the apparatus is a master and which of them is a slave. Next, the service determination unit 320 determines which of the apparatus and each device to be connected to the apparatus using the organism as a transmission channel is a master and which of them is a slave. Then, the apparatus and each device exchange signals using the master/slave method in which a master starts to transmit data to a slave and the slave responds to the master and execute a service determined between them. According to a specific example of a communication method in this case, the master notifies the slave of data transmission and queries, at regular intervals, whether the slave has data to transmit. If the master permits data transmission from the slave, the slave transmits data to the master. Examples of a master/slave determination method are as follows. First, resources, such as the processing power of a processor and the size of a random access memory (RAM), are calculated, and a more powerful device is determined to be a master. Second, a device which is a major signal source or a service provider is determined to a master. Third, of power resources including batteries and line power, a device powered by batteries is determined to be a master. Fourth, when devices are connected to each other using the organism as a transmission channel, a device, which first transmits a device identifier, is set to be a master. Since there are a variety of master/slave determination methods other than the above examples, the present invention is not limited to the above examples.

Figure 4:
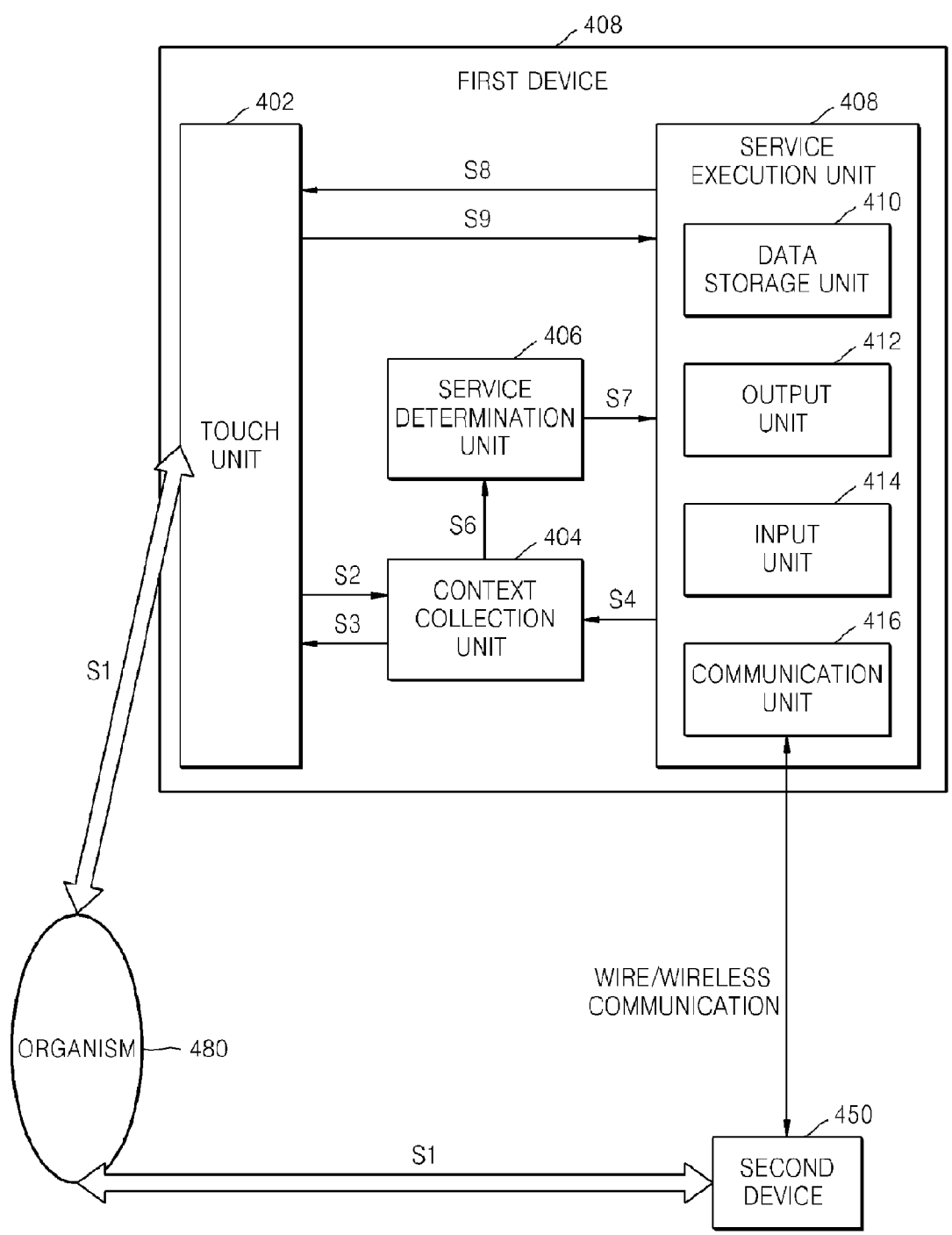
FIG. 4 is a block diagram of a system for providing a TAP-based service according to an embodiment of the present invention.

FIG. 4 is a block diagram of a system for providing a TAP-based service according to an embodiment of the present invention. The system includes a first device 400 and a second device 450. At least one organism 480 is involved in the interaction between the first device 400 and the second device 450.

Referring to FIG. 4, the first device 400 includes a touch unit 402, a context collection unit 404, a service determination unit 406, and a service execution unit 408. The second device 450 also includes identical elements (not shown).

When the organism 480 touches the second device 450 and the first device 400, the touch unit 402 transmits/receives an electrical signal including predetermined information S1 to/from the second device 450.

The context collection unit 404 collects context information from the touch by the organism 480. In this case, examples of the context information include a time/place of the touch, an identifier of the organism 480, a device identifier of the second device 450, the state of the second device 450 when touched by the organism 480, an identifier of the first device 400, and the state of the first device 400 when touched by the organism 480. However, the present invention is not limited thereto. According to an example of a method of obtaining information regarding the device identifier of the second device 450 and the state of the second device 450 when touched by the organism 480, the electrical signal received by the touch unit 402 includes information regarding the device identifier of the second device 450 and the state of the second device 450 when touched by the organism 480. In other words, a touch unit (not shown) of the second device 450 provides the information regarding the device identifier of the second device 450 and the state of the second device 450 when touched by the organism 480 to the touch unit 402 of the first device 400 using the organism 480 as a transmission channel.

Examples of the state of a device include activated functions and activated resources. In addition, examples of the activated resources include types of activated files and activated channels. However, the present invention is not limited thereto. In the case of a multi-function device, it may be desirable in terms of context utilization to provide a function identifier of the multi-function device, which is information regarding an activated function of the multi-function device, in addition to a device identifier of the multi-function device. For example, if the second device 450 is a PDA, the second device 450 provides the touch unit 402 of the first device 400 with the information S1 including the device identifier of the second device 450 and a function identifier of an activated function of the second device 450. Then, the context collection unit 404 provides context information including the information S1 to the service determination unit 406. In so doing, the accuracy of intuitive service determination can be secured.

The context collection unit 404 collects the information S1 received through the organism 480, information S4 provided by the service execution unit 408, and information provided by various peripherals (not shown). Information S2 may include the device identifier and state of the second device 450 contained in the information S1. The information S4 may include information regarding the device identifier and state of the first device 400. In addition, the context collection unit 404 may receive from the various peripherals (not shown) the time/place when/where they were touched by the organism 480. Accordingly, the context collection unit 404 provides collected context information S3 of the first device 400 to the touch unit 402. Then, the touch unit 402 transmits the context information S3 to the second device 450 through the organism 480 so that the second device 450 can accurately execute an intuitive service.

Based on context information S6 collected by the context collection unit 404, the service determination unit 406 determines a service to be provided through the interaction between the first device 400 and the second device 450. Then, the service determination unit 406 transmits to the service execution unit 408 a command S7 indicating an operation that should be performed by the first device 400 to provide the determined service. According to an example of a service determination method, the service determination unit 406 may include a context-aware matrix indicating context and a service that corresponds to the context and determine the service to be provided based on the collected context information and the context-aware matrix. However, the present invention is not limited thereto. The context-aware matrix will be described in detail later.

Referring to FIG. 4, the service execution unit 408 includes a data storage unit 410, an output unit 420, an input unit 414, and a communication unit 416. However, it may be fully understood by those of ordinary skill in the art that some of these elements may be omitted or other elements may be added according to attributes of the first device 400. The service execution unit 408 executes the operation required to provide the determined service using the data storage unit 410, the output unit 420, the input unit 414, and the communication unit 416. The data storage unit 410 stores service data required to execute the determined service. The output unit 420 includes a speaker and a display unit depending on the attributes of the first device 400. The input unit 414 includes an input panel, a recoding unit and a photographing unit depending on the attributes of the first device 400. The communication unit 416 performs a wired/wireless communication function.

The service data required to execute the determined service may be exchanged between the communication unit 416 of the first device 400 and a communication unit (not shown) of the second device 450 through general wired/wireless communication. However, it may be desirable, in terms of user convenience, for the touch unit 402 of the first device 400 and a touch unit (not shown) of the second device 450 to use the organism 480 as a transmission channel. In this case, the service execution unit 408 may provide service data S8 to the touch unit 402 or receive service data S9 from the touch unit 402 and perform the operation.

The TAP-based service system according to the present embodiment will now be described using specific examples. A first example is a case where the first device 400 is a fixed audio player such as a home audio player having a speaker and the second device 450 is a mobile audio player such as an MP3 player. In this case, if a user listening to music on the MP3 player comes home and touches the home audio player, the music that the user was listening to on the MP3 player is played back by the home audio player. A second example is a case where the first device 400 is a fixed broadcasting receiver such as a television (TV) and the second device 450 is a mobile broadcasting receiver such as a digital multimedia broadcasting (DMB) TV. In this case, while watching a channel on the DMB TV, if a user comes home and touches the TV, the channel that the user was watching on the DMB TV is provided on the TV at home. A third example is a case where the first device 400 is a fixed moving-image playback device such as a TV and the second device 450 is a mobile moving-image photographing device such as a camcorder. In this case, after photographing a moving image using the camcorder, if a user comes home and touches the TV at home while reproducing the photographed moving image using the camcorder, a wireless 1394 network is formed through human body communication. Therefore, the moving image is transmitted to the TV from the camcorder over the wireless 1394 network and is reproduced on the TV.

The touch unit 402 of the first device 400 exchanges electrical signals with the touch unit (not shown) of the second device 450 using the organism 480, e.g., a user, as a transmission channel. To this end, a physical signalling transmission method, a data transfer method, and a network management method must be defined.

Figure 5A:
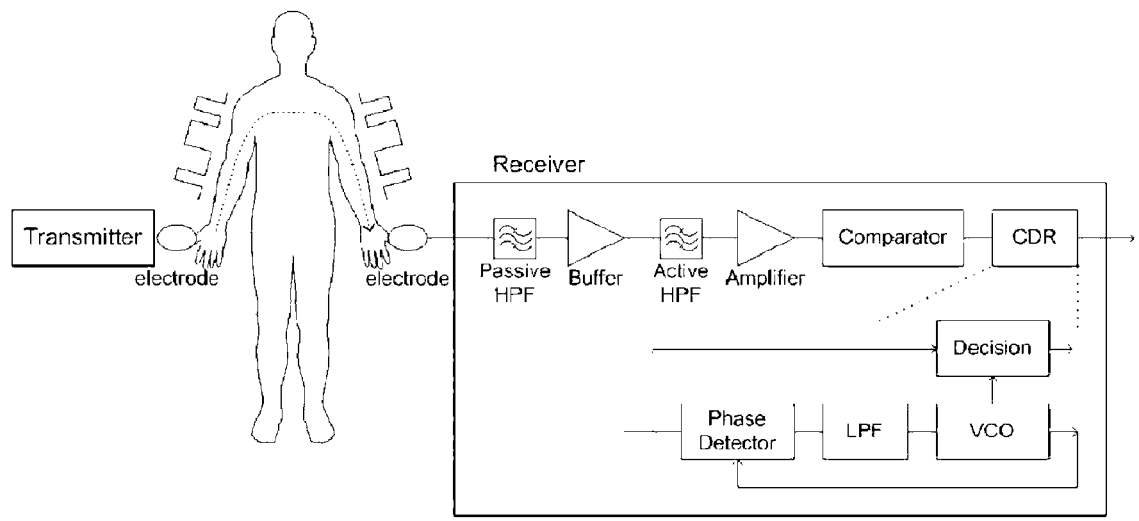
FIGS. 5A and 5B are diagrams illustrating experimental environments and results according to an embodiment of the present invention.
Figure 5B:
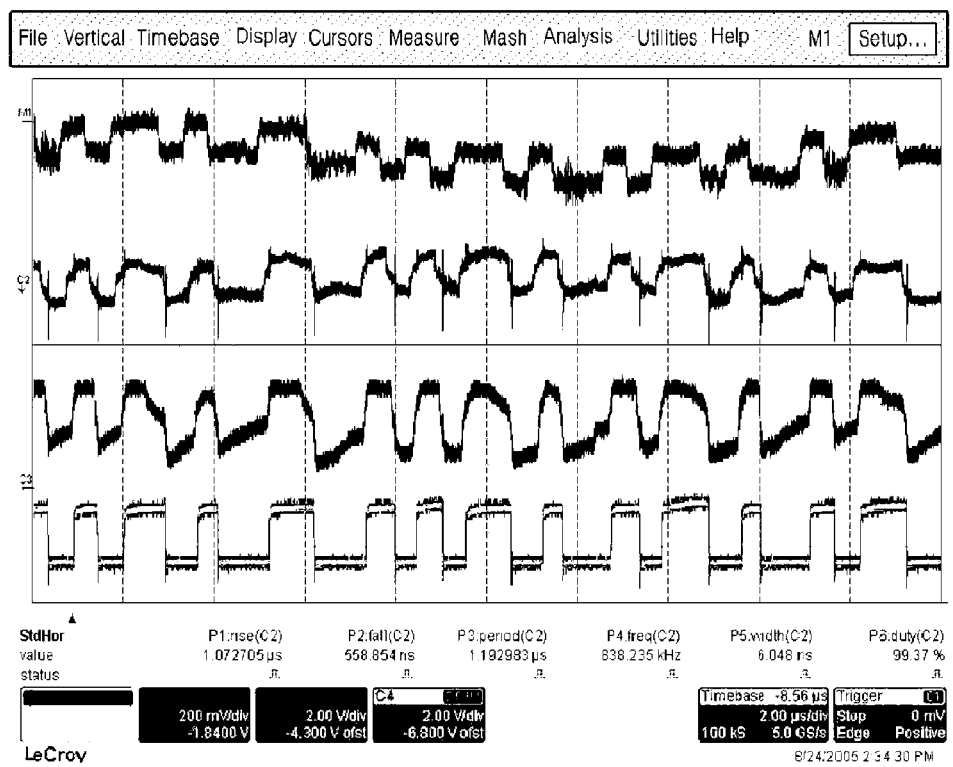

First, the physical signalling transmission method will be described. Various signal transmission methods, such as the NRZ signal transmission method described above, may be used as the physical signalling transmission method. In an experiment according to the present embodiment, it was possible to transmit/receive a signal at 1 Mbps using an electronic sensor and the NRZ signal transmission method. FIG. 5A illustrates an intra-body transmitter/receiver system according to an embodiment of the present invention. An output signal of a universal asynchronous receiver transceiver (UART) of Microcontroller was used in the experiment. The amplitude of the output signal was 3 V, and a data transmission rate was 1 Mbps in the case of Manchester coding. The signal measured at a receiving site was approximately 100 mV peak to peak. FIG. 5B is a waveform diagram of signals measured at various terminals of a receiver of the intra-body transmitter/receiver system of FIG. 5A. Specifically, FIG. 5B illustrates waveforms of an input signal to a receiver, an output signal of a filter, an output signal of an amplifier and an output signal of a clock data recovery (CDR) in descending order.

Second, the data transfer method will be described. In intra-body communication, broadband signalling has one communication channel, which denotes that transmission and reception cannot be performed simultaneously. Therefore, a communication protocol for avoiding data collision is required. Here, various strategies, such as a channel sensing multiple access (CSMA), a time division multiple access (TDMA) and a master/slave structure, may be used. However, additional hardware is required to detect CSMA data transmission. In addition, the TDMA also requires addition hardware since a high-quality synchronized clock is needed. In this regard, half duplex communication using the master/slave method may be suitable for a TAP-based service.

Third, the network management method will be described. Network connection for a TAP-based service tends to happen frequently and at relatively short intervals. Furthermore, members of the network tend to change constantly. Therefore, an ad-hoc network may be appropriate for the TAP-based service.

Based on this assumption that the master/slave method and the ad-hoc network are used, the embodiment of FIG. 4 will be described additionally.

The touch unit 402 of the first device 400 transmits an electrical signal including a function identifier of the first device 400 to the second device 450 and receives an electrical signal including a function identifier of the second device 450 from the second device 450. In other words, when network connection is not yet available, the touch unit 402 transmits a configuration packet twice per second. The configuration packet includes the function identifier of the first device 200. The function identifier denotes a function of an intelligent device. In addition, when receiving a configuration packet, a receiver transmits a configuration packet of its own. A packet consists of a header and data. The header includes a packet number, a cyclic redundancy check code for sensing an error, a destination address, and a control code indicating whether the packet is a data packet or a control packet including acknowledgement (ACK) and no acknowledgement (NACK).

The service determination unit 406 presets the master/slave relationship between the first device 400 and each type of devices that can be connected to the first device 400. After presetting the master/slave relationship, the service determination unit 406 determines whether the first device 400 is a master based on the received function identifier of the second device 450 and that of the first device 400. To preset the master/slave relationship, the service determination unit 406 may, for example, add information regarding the master/slave relationship between two devices for each context to the context-aware matrix described above. Once a master is determined in this process, the subsequent transmission is initiated by the master through the touch unit 402.

In other words, based on the determined master/slave relationship, the touch unit 402 exchanges electrical signals including service data with the second device 450 using the master/salve transmission method. According to the master/slave method, a master always initiates communication, and a slave responds to the master. When the master transmits data to the slave, it notifies the slave of data transmission and then transmits the data to the slave. Conversely, when the slave transmits data to the master, the master queries the slave whether the slave has data to transmit with preset frequency (for example, twice per second). If the master permits the data transmission, the slave starts to transmit the data.

Examples of a method of determining service data may include a method of determining a currently activated file as service data and a method of including an additional unit for selecting service data. In the former method, if two MP3 players are connected to each other, a currently played playlist on one of the two MP3 players is selected as service data and is transmitted to the other MP3 player. If a digital camera and a TV are connected to each other, a picture file currently activated on an LCD window is selected as service data and is transmitted to the TV.

FIG. 6 illustrates a context-aware matrix according to an embodiment of the present invention. A case where a user touched a digital camera and a printer will be described with reference to FIG. 6. In the context-aware matrix of FIG. 6, an arrow or F indicates a master. Specifically, an arrow indicates master, and F indicates a device which first transmits a configuration packet, that is, master. For example, in the case of a digital camera and a printer, the printer is a master as illustrated in FIG. 6. In addition, each service activity required of two devices is shown in the content of the context-aware matrix illustrated in FIG. 6. In the above example, 'Print Photo,' that is, an operation of printing a picture file, is determined to be a service activity required of the digital camera and the printer. Therefore, the digital camera transmits a picture data filter to the printer. By simply touching the digital camera and the printer, the user can perform the printing operation. In other words, a TAP-based service is being implemented.

The context-aware matrix is implemented such that the most intuitive interaction between two intelligent appliances can be achieved. When a new device is developed, the context-aware matrix may be expanded.

While there may an obvious interaction between two devices, such as the interaction between a digital camera and a printer, an obvious interaction may not exist between two devices, such as the interaction between an MP3 player and a digital camera. Therefore, a kind of interaction level is required to prevent an interaction unintended by a user. Services underlined in the context-aware matrix of FIG. 6 are those with an interaction level A, and services which are not underlined are those with an interaction level B. In the embodiment of FIG. 6, the services with interaction level A are sufficiently intuitive for general use, and the services with interaction level B are not fully intuitive for general use but still useful. The execution levels, that is, automation levels of High, Normal, Low and None, and interaction levels A and B according to the embodiment of FIG. 6 will now be described together. If a user set the execution level to 'None,' even when the user touches two devices, the two devices do not provide a TAP-based service to the user. If the user set the execution level to 'High,' the two devices execute the determined service unconditionally. If the user set the execution level to 'Normal,' the two devices execute the determined service when the interaction level of the determined service is A and do not execute the determined service when the interaction level of the determined service is B. If the user set the execution level to 'Low,' the two devices provide the user with not only the determined service but also all services that they can provide through a user interface. Then, the user himself selects a service to be executed from the services provided by the two devices. In other words, in the case of execution level 'High,' the two devices determine to execute services with interaction levels A or B. In the case of execution level 'Normal,' the two devices determine to execute services with interaction level A only. In the case of execution level 'Low,' the two devices determine to execute services permitted by the user. Finally, in the case of execution level 'None,' the two devices determine not to execute a TAP-based service.

A case where one of the two devices is a camera will now be described with reference to FIG. 6. Referring to FIG. 6, services, such as 'Camera connection,' 'Slide show,' 'Print photo,' 'Set as wall paper,' are mapped to the camera. If a user sets the execution level to 'Normal' using an execution level setting unit 310 included in the camera, when the user touches the camera and a mobile phone, the service 'Set as wall paper' is not executed. However, when the user touches the camera and a TV, since the determined service in this case is 'Slide show,' which is a service with interaction level A, a picture file is transmitted from the camera to the TV, and the service 'Slide show' is executed on the TV. If the user sets the execution level to 'Low,' the user selects a service to permit from the above four services using an interface (an LCD and buttons) of the camera.

Since services according to the present invention are executed automatically, some of the services undesired by a user could be executed. Setting the execution level described above may be one solution to this problem. Setting the execution level may be likened to giving autonomy to servants. Setting the execution level may result in a reduction of benefits of new technology. Therefore, a trade-off between automated service and security is required.

FIG. 7 illustrates the result of applying the present invention to a digital camera, a high-definition TV (HDTV), and a printer. In other words, based on the protocol described above, a demo application was executed. A demo application scenario is that a user having the digital camera touches the HDTV and watches a picture displayed both on an LCD display of the camera and the HDTV.

Figure 8:
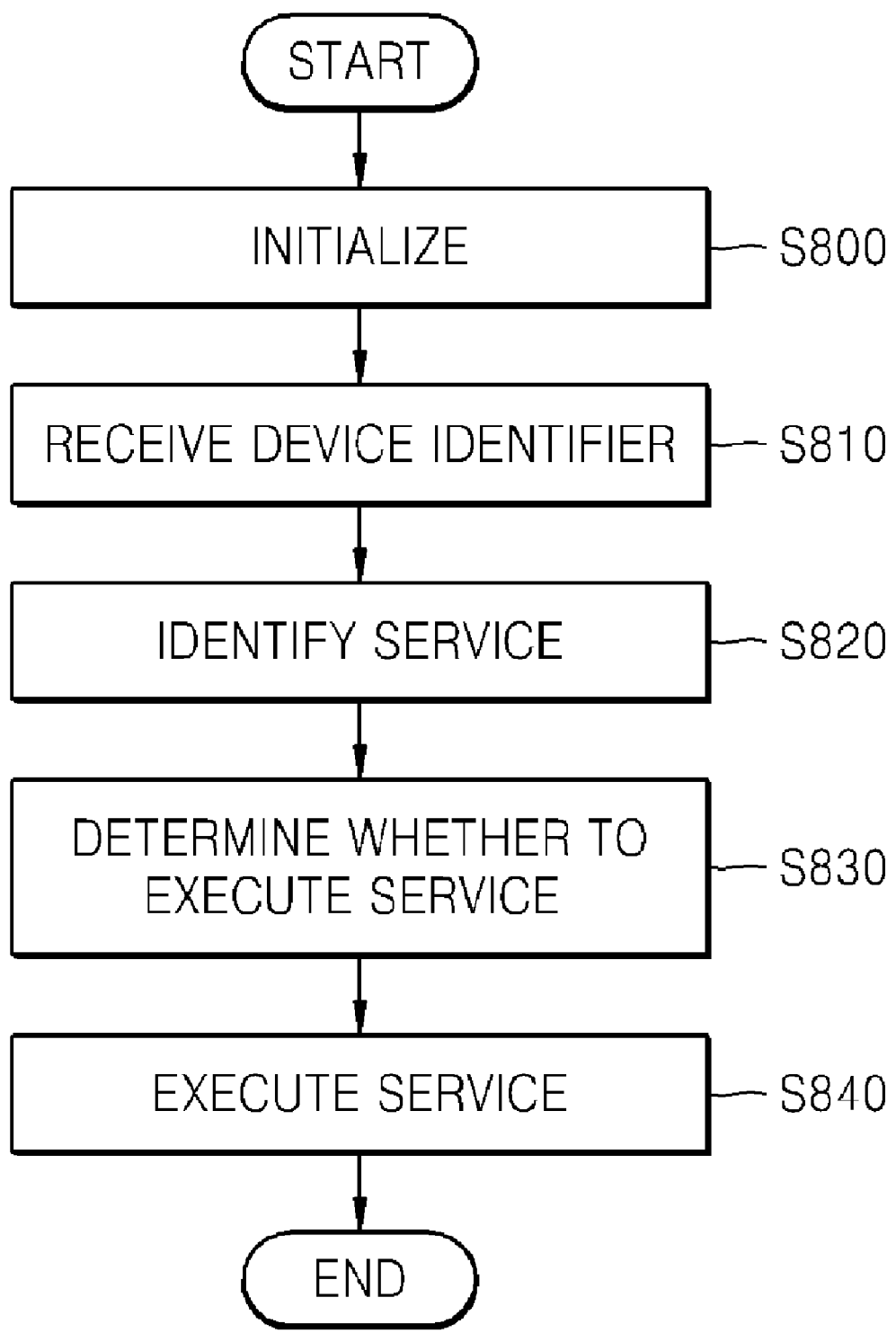
FIG. 8 is a flowchart illustrating a method of providing a TAP-based service according to an embodiment of the present invention.

FIG. 8 is a flowchart illustrating a method of providing a TAP-based service according to an embodiment of the present invention. Referring to FIG. 8, the method includes operations time-sequentially performed by the apparatus illustrated in FIG. 3. Although omitted here, all operations described above in relation to the apparatus of FIG. 3 are applied to the method.

Referring to FIG. 8, in operation S800, initialisation is performed so that two devices can provide a TAP-based service. In this case, initialisation includes an operation of setting respective device identifiers of a plurality of devices which can be connected to a device using an organism as a transmission channel and setting services to be provided to a user through the interaction between the device and each of the devices corresponding to the device identifiers, respectively, and an operation of having at least two execution levels such that one of the at least two execution levels can be selected in order to determine whether to execute a service in cooperation with one of the devices.

In operation S810, if the device is connected to one of the devices using the organism as a transmission channel, the device receives a device identifier of the other device.

In operation S820, the device recognizes services set for the other device and identifies a service to be provided to the user by interacting with the other device.

In operation S830, the device determines whether to execute the identified service according to the set execution level.

In operation S840, the device automatically recognizes information required to provide a service determined to be executed in cooperation with the other device and executes the determined service.

When the master/slave method is used, operation S820 includes an operation of determining which of the two devices is a master or a slave. In addition, operation S840 includes an operation of exchanging signals between the two devices using the master/slave method in which the master initiates data transmission and the slave responds to the master.

Figure 9A:
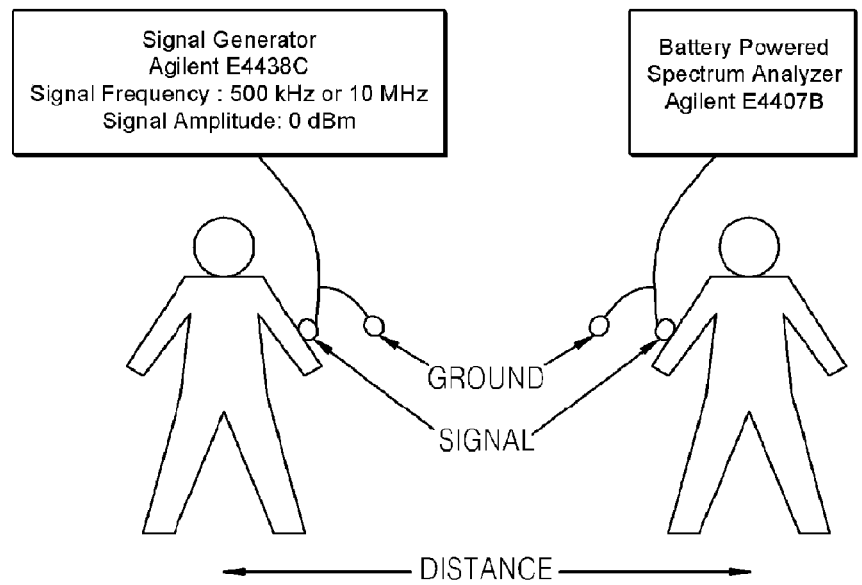
FIGS. 9A and 9B are diagrams illustrating an experiment environment for measuring interference and the experimental results according to an embodiment of the present invention.

FIG. 9A illustrates the results of interference measurement performed by a system that executes an apparatus and method for providing a TAP-based service according to an embodiment of the present invention.

Figure 9B:
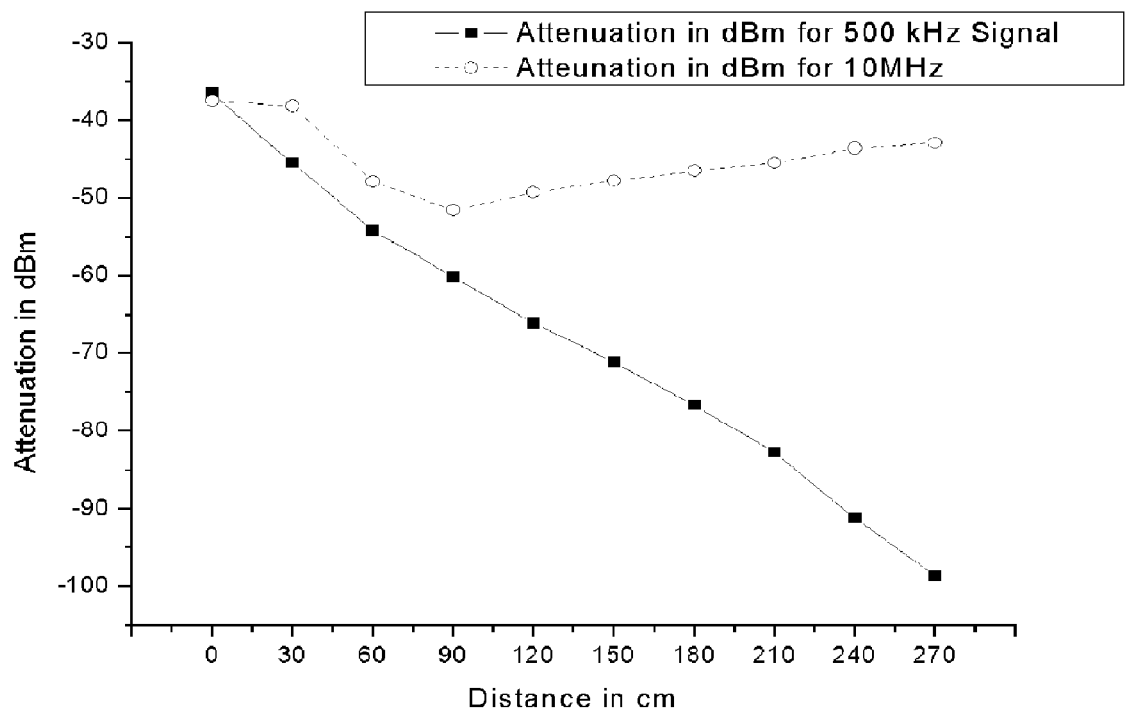

FIG. 9B is a graph illustrating the experimental results of FIG. 9A. Referring to FIG. 9B, interference is attenuated from a signal by 30 dBm within a radius of 1 meter, which denotes that the present invention is safe in terms of privacy.

Figure 10:
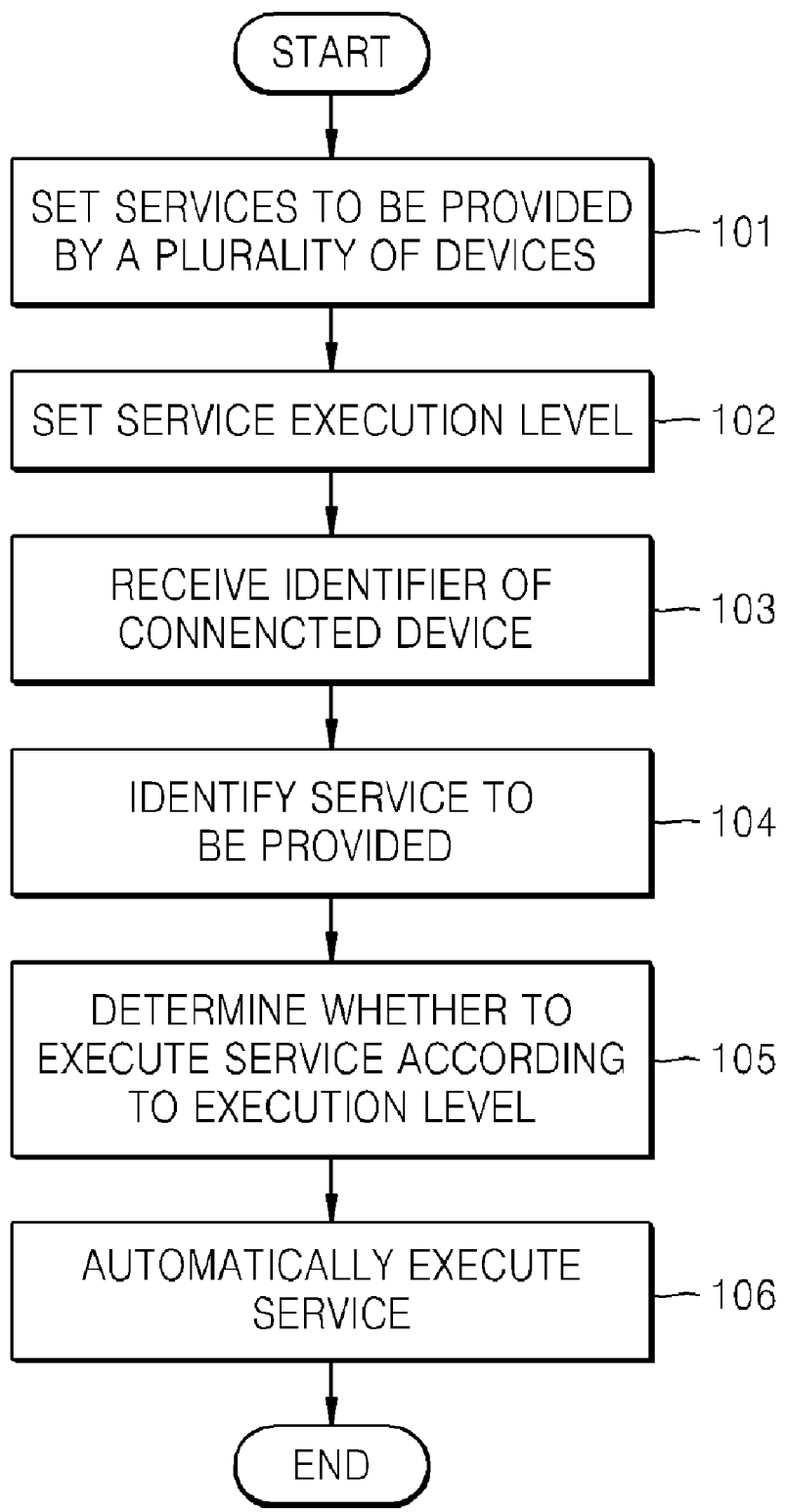
FIG. 10 is a detailed flowchart illustrating a method of providing a TAP-based service based on a service execution level according to an embodiment of the present invention.

FIG. 10 is a detailed flowchart illustrating a method of providing a TAP-based service based on a service execution level according to an embodiment of the present invention.

Referring to FIG. 10, respective device identifiers of a plurality of devices which can be connected to a device using an organism as a transmission channel are set and a service to be provided to a user through the interaction between the device and each of the devices corresponding to the device identifiers, respectively, is set (operation 101). Then, at least two execution levels are prepared such that one of the at least two execution levels can be selected in order to determine whether to execute a service in cooperation with one of the devices, and one of the at least two execution levels is set by an input from the user (operation 102).

If the device is connected to one of the devices using the organism as a transmission channel, the device receives a device identifier of the other device (operation 103). The device recognizes services set for the other device and identifies a service to be provided to the user by interacting with the other device (operation 104).

If the device determines whether to execute the identified service according to the set execution level (operation 105), the device automatically recognizes information required to provide a service determined to be executed in cooperation with the other device and executes the determined service (operation 106).

Figure 11:
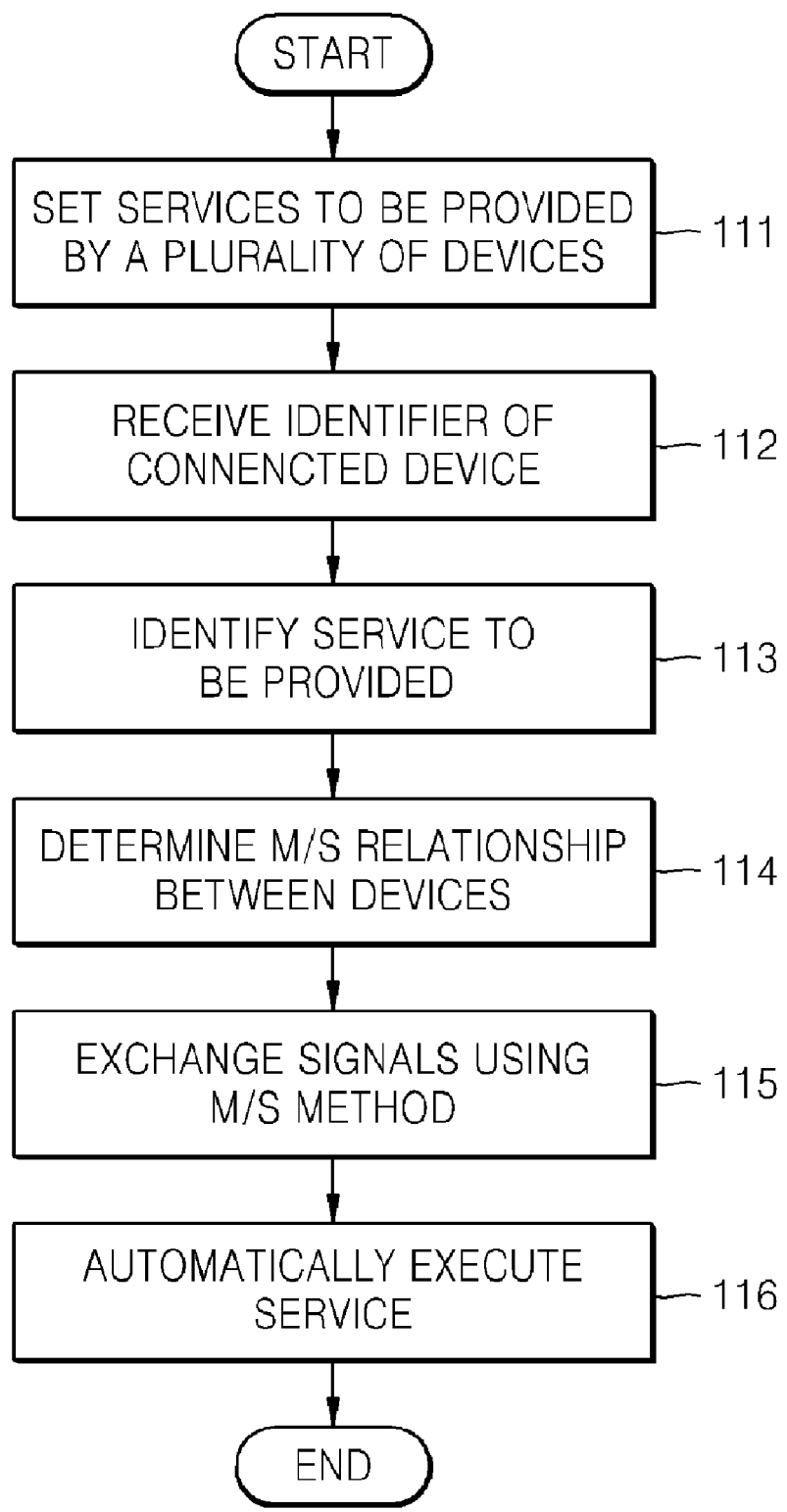
FIG. 11 is a detailed flowchart illustrating a method of providing a TAP-based service using a master/slave method according to another embodiment of the present invention.

FIG. 11 is a detailed flowchart illustrating a method of providing a TAP-based service using a master/slave method as a communication protocol for avoiding data collision in data transmission between devices according to another embodiment of the present invention.

Referring to FIG. 11, respective device identifiers of a plurality of devices which can be connected to a device using an organism as a transmission channel are set and a service to be provided to a user through the interaction between the device and each of the devices corresponding to the device identifiers, respectively, is set (operation 111). If the device is connected to one of the devices using the organism as a transmission channel, the device receives a device identifier of the other device (operation 112). Then, the device recognizes services set for the other device and identifies a service to be provided to the user by interacting with the other device (operation 113).

The master/slave relationship between the two devices is determined (operation 114). Once the master/slave relationship is determined, the two devices exchange signals using a master/slave method in which a master initiates data transmission to a slave and the slave responds to the master (operation 115). The device automatically recognizes information required to provide a service determined to be executed in cooperation with the other device and executes the determined service (operation 116).

FIG. 10 is a flowchart illustrating an embodiment of the present invention based on an execution level, and FIG. 11 is a flowchart illustrating an embodiment of the present invention based on the master/slave method. The embodiments of FIGS. 10 and 11 may be implemented in various forms with reference to the detailed description of the present invention made above based on FIGS. 2 through 8.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion. Also, functional programs, code, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of providing a touch and play (TAP)-based service, the method comprising:
   setting respective device identifiers of a plurality of devices, wherein each of the devices can be coupled to a first device using a human body as a transmission channel;
   setting services to be provided to a user through an interaction between the first device and each of plurality of devices, which correspond to the respective device identifiers;
   selecting one of at least two execution levels in order to determine whether to execute a service in cooperation with one of the plurality of devices;
   setting the selected execution level according to an input from a user;
   receiving a first device identifier of a second device if the first device is coupled to the second device using the human body as the transmission channel;
   recognizing the services set for the second device and identifying a first service that is to be provided to the user through the interaction between the first device and the second device;
   determining whether to execute the first service based on the set execution level;
   recognizing, automatically, information required to provide the first service if the first service is determined to be executed in cooperation with the second device; and
   executing the first service.

2. The method of claim 1, wherein the execution levels are classified into an execution level 'High' indicating that all services, which are respectively set for the devices in the setting of the respective device identifiers of the devices and the setting of the service that is to be provided to the user, can be executed, an execution level 'Normal' indicating that only a designated service can be executed, an execution level 'Low' indicating that the user can select a service using a separate interface and execute the selected service, and an execution level 'None' indicating that no service can be executed.

3. The method of claim 1, wherein, in the determining of whether to execute the first service, each service that is to be provided by each of the devices, which will be coupled to the first device using the human body as the transmission channel, is matched with one of the execution levels, and whether to execute the first service is determined according to the execution level set by the user.

4. The method of claim 3, wherein each service is matched with one of the execution levels according to the degree of obvious interaction between the first device and each of the devices to be coupled to the first device using the human body as the transmission channel and may be executed accordingly.

5. The method of claim 1, further comprising identifying which of the first device and the second device is a master and which is a slave.

6. The method of claim 5, wherein, if a master/slave relationship between the two devices coupled using the human body as the transmission channel is determined, the two coupled devices exchange signals using a master/slave method in which the master initiates data transmission and the slave responds to the master and executes a service determined between the two coupled devices.

7. The method of claim 6, wherein the master notifies the slave of data transmission and, at regular intervals, queries the slave whether the slave has data to transmit, and if the master permits data transmission from the slave, the slave transmits the data to the master.

8. The method of claim 5, wherein the master/slave relationship between the two coupled devices is determined based on at least one of an extent of resources of each device, such as processing power or the size of a random access memory (RAM), whether one of the two coupled devices is a major signal source or a service provider, and a power supply method.

9. A method of providing a TAP-based service, the method comprising:
   setting respective device identifiers of a plurality of devices which can be coupled to a first device using a human body as a transmission channel and setting services to be provided to a user through the interaction between the first device and each of the devices corresponding to the device identifiers, respectively;
   receiving a first device identifier of a second device if the first device is coupled to the second device using the human body as the transmission channel;
   recognizing the services set for the second device and identifying a first service to be provided to the user through the interaction between the first device and the second device;
   determining which of the first device and the second device is a master or a slave;
   exchanging signals using a master/slave method in which the master initiates data transmission and the slave responds to the master if a master/slave relationship between the two devices is determined; and
   recognizing, automatically, information required to provide the first service that is determined to be executed in cooperation with the second device and executing the first service.

10. The method of claim 9, wherein, in the exchanging of the signals, the master notifies the slave of data transmission and, at regular intervals, queries the slave whether the slave has data to transmit, and if the master permits data transmission from the slave, the slave transmits the data to the master.

11. The method of claim 9, further comprising obtaining information required to identify which of the first device and the second device is the master and which is the slave.

12. The method of claim 11, wherein a master/slave relationship between the two coupled devices is determined based on at least one of an extent of resources of each device, such as processing power or the size of a random access memory (RAM), whether one of the two coupled devices is a major signal source or a service provider, and a power supply method.

13. The method of claim 9, wherein, in the determining of which of the first device and the second device is the master or the slave, whichever device first transmits a device identifier when the two devices are coupled using the human body as the transmission channel is determined to be the master.

14. An apparatus for providing a TAP-based service, the apparatus comprising:
   a service setting unit configured to set respective device identifiers of a plurality of devices which can be coupled to the apparatus using a human body as a transmission channel and to set services that are to be provided to a user through an interaction between the apparatus and each of the devices corresponding to the device identifiers, respectively;
   an execution level setting unit configured to have at least two execution levels so that one of the at least two execution levels can be selected in order to determine whether to execute a service in cooperation with one of the devices and to set one of the at least two execution levels according to an input from a user;

a service determination unit configured to receive a device identifier of one of the devices if the apparatus is coupled to the device using the human body as the transmission channel, to recognize services set for the device, to identify a first service to be provided to the user through the interaction between the apparatus and the device, and to determine whether to execute the first service according to the execution level set by the user; and a service execution unit configured to automatically recognize information required to provide the first service that is determined to be executed in cooperation with the device and to execute the first service.

15. The apparatus of claim 14, wherein the execution levels are classified into an execution level 'High' indicating that all services, which are respectively set for the devices can be executed, an execution level 'Normal' indicating that only a designated service can be executed, an execution level 'Low' indicating that the user can select a service using a separate interface and execute the selected service, and an execution level 'None' indicating that no service can be executed.

16. The apparatus of claim 14, wherein the service determination unit is configured to match each service to be provided by each of the devices, which will be coupled to the apparatus using the human body as the transmission channel, with one of the execution levels and determine whether to execute the first service according to the execution level set by the user.

17. The apparatus of claim 16, wherein each service is matched with one of the execution levels according to the degree of obvious interaction between the apparatus and each of the devices to be coupled to the apparatus using the human body as the transmission channel and may be executed accordingly.

18. The apparatus of claim 14, wherein the service setting unit further comprises information required to identify which of the apparatus and the device coupled to the apparatus is a master or a slave.

19. The apparatus of claim 18, wherein, if a master/slave relationship between the apparatus and the device coupled to the apparatus using the human body as the transmission channel is determined, the apparatus and the device exchange signals using a master/slave method in which the master initiates data transmission and the slave responds to the master and executes a service determined between the apparatus and the device.

20. The apparatus of claim 19, wherein the master notifies the slave of data transmission and, at regular intervals, queries the slave whether the slave has data to transmit, and if the master permits data transmission from the slave, the slave transmits the data to the master.

21. The apparatus of claim 19, wherein the master/slave relationship between the apparatus and the device is determined based on at least one of an extent of resources, such as processing power or the size of a random access memory (RAM), whether the apparatus or the device is a major signal source or a service provider, and a power supply method.

22. An apparatus for providing a TAP-based service, the apparatus comprising:

a service setting unit configured to set respective device identifiers of a plurality of devices which can be coupled to the apparatus using a human body as a transmission channel and to set services to be provided to a user through an interaction between the apparatus and each of the devices corresponding to the device identifiers, respectively;

a service determination unit configured to receive a device identifier of one of the devices if the apparatus is coupled to the device using the human body as the transmission channel, to recognize services set for the device, and to identify a service that is to be provided to the user through the interaction between the apparatus and the device; and a service execution unit configured to determine which of the apparatus and the device coupled to the apparatus is a master or a slave, to automatically recognize information required to provide the service that is determined to be executed in cooperation with the device after the apparatus and the device exchange signals using a master/slave method in which the master initiates data transmission and the slave responds to the master, and to execute the service.

23. The apparatus of claim 22, wherein the master notifies the slave of data transmission and, at regular intervals, queries the slave whether the slave has data to transmit, and if the master permits data transmission from the slave, the slave transmits the data to the master.

24. The apparatus of claim 22, wherein the service setting unit further comprises information required for identifying which of the apparatus and the device coupled to the apparatus is the master and which is the slave.

25. The apparatus of claim 24, wherein a master/slave relationship between the apparatus and the device coupled to the apparatus is determined based on at least one of an extent of resources, such as processing power or the size of a random access memory (RAM), whether the apparatus or the device is a major signal source or a service provider, and a power supply method.

26. The apparatus of claim 22, wherein the service execution unit is configured to set the device or the apparatus that first transmits a device identifier when the apparatus and the device are coupled using the human body as the transmission channel, to be the master.

27. A system for providing a TAP-based service using interaction between a plurality of devices, each of the devices comprising:

a touch unit configured to transmit/receive information to/from a second device using at least one human body as a transmission channel when the human body touches a first device and the second device;

a context collection unit configured to collect context information including the transmitted/received information from the touch by the human body;

a service determination unit configured to determine a first service that is to be provided to a user through the interaction between the first device and the second device based on the collected context information; and a service execution unit configured to execute an operation corresponding to the first service.

28. The system of claim 27, wherein the touch unit is configured to transmit/receive service data required to execute the first service to/from the second device using the human body as the transmission channel, and the service execution unit is configured to execute the operation by providing the service data to the touch unit or receiving the service data from the touch unit.

29. The system of claim 28, wherein the devices are mobile and fixed audio players, and the first service to be executed is to playback an audio file currently being played back by the mobile audio player using the fixed audio player.

30. The system of claim 28, wherein the devices are mobile and fixed broadcasting receivers, and the first service to be executed is to provide the user with a broadcasting program on a channel being received by the mobile broadcasting receiver using the fixed broadcasting receiver.

31. The system of claim 28, wherein the devices are mobile moving-image photographing devices and fixed moving-image playback devices, and the first service to be executed is to playback a moving-image photographed and currently being played back by the mobile moving-image photographing device using the fixed moving-image playback device.

32. The system of claim 27, wherein the context information comprises a time/place of the touch, an identifier of the human body, a device identifier of the second device, the state of the second device when touched by the human body, an a device identifier of the first device, and the state of the first device when touched by the human body.

33. The system of claim 27, wherein the received information comprises the device identifier of the second device and the state of the second device when touched by the human body, and the transmitted information comprises the device identifier of the first device and the state of the first device when touched by the human body.

34. The system of claim 32 or 33, wherein the state comprises activated functions and resources.

35. The system of claim 27, wherein the service determination unit comprises a context-aware matrix indicating a context and a service corresponding to the context and determines the service to be provided to the user based on the collected context information and the context-aware matrix.

36. A method of providing a TAP-based service, the method comprising:
setting respective device identifiers of a plurality of devices which can be coupled to a first device using a human body as a transmission channel and setting services to be provided to a user through interaction between the first device and each of the devices corresponding to the device identifiers, respectively;
receiving a device identifier of a second device if the first device is coupled to the second device using the human body as the transmission channel;
recognizing services set for the second device and identifying a service that is to be provided to the user through the interaction between the first device and the second device;
exchanging data required to provide the identified service with the second device using the human body as the transmission channel; and
executing the identified service based on the exchanged data.

37. The method of claim 36, wherein the device identifiers and the data are exchanged using the human body as the transmission channel.

* * * * *